F. L. SESSIONS.
CABLE REELING MECHANISM.
APPLICATION FILED MAY 12, 1911.
1,178,881.
Patented Apr. 11, 1916.
2 SHEETS—SHEET 1.
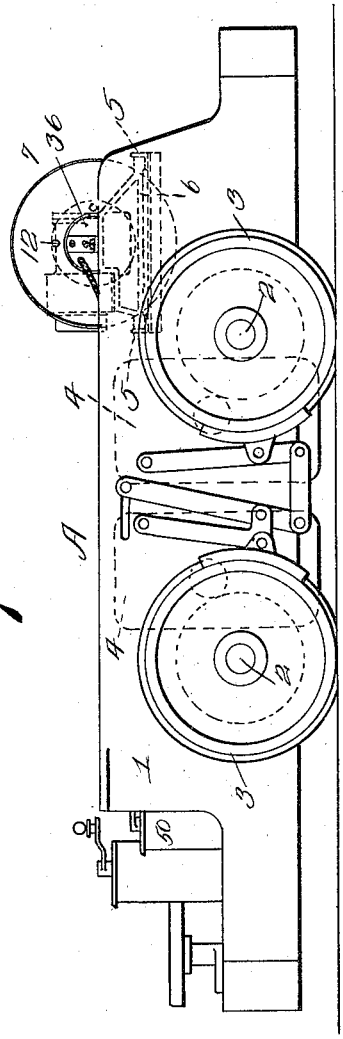
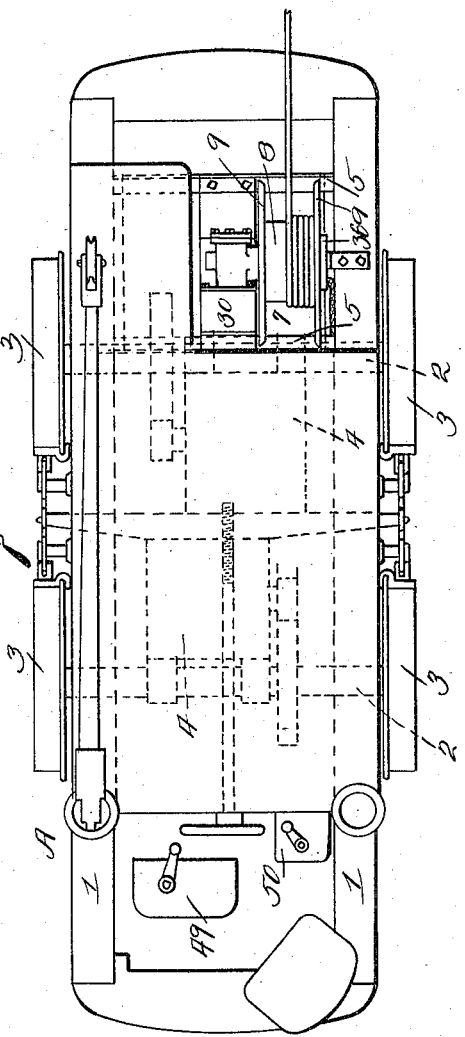

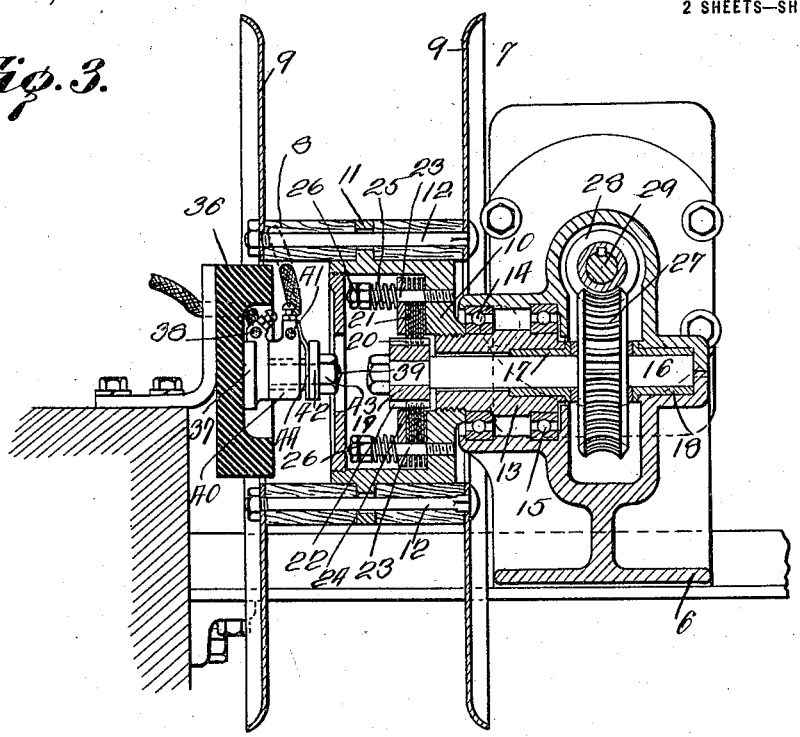
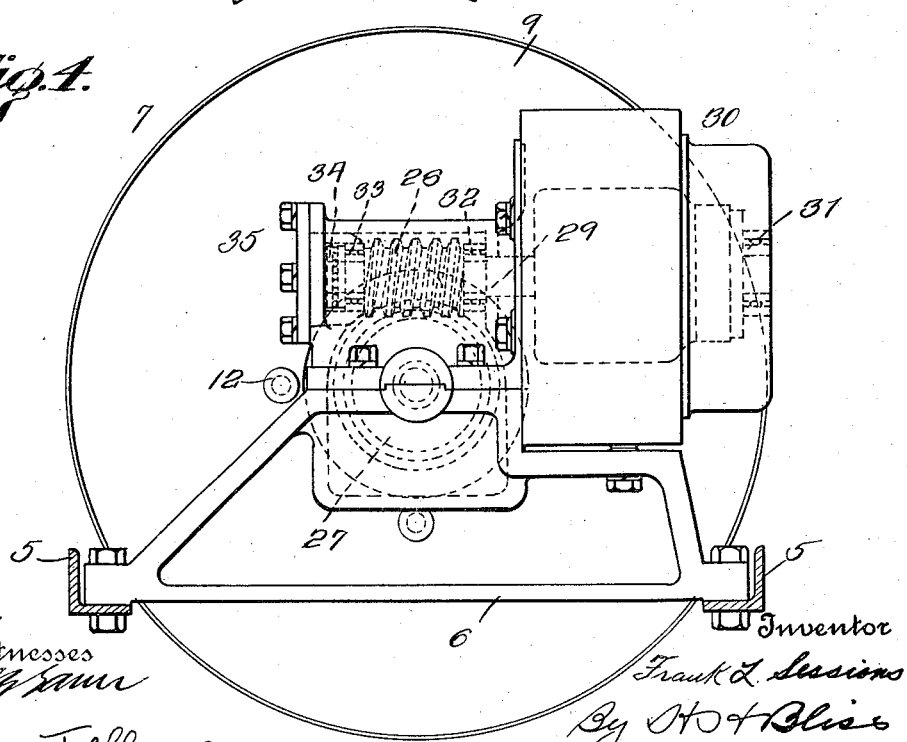

UNITED STATES PATENT OFFICE.

FRANK L. SESSIONS, OF COLUMBUS, OHIO, ASSIGNOR TO THE JEFFREY MANUFACTURING COMPANY, A CORPORATION OF OHIO.

CABLE-REELING MECHANISM.

1,178,881.   Specification of Letters Patent.   Patented Apr. 11, 1916.

Application filed May 12, 1911. Serial No. 626,656.

*To all whom it may concern:*

Be it known that I, FRANK L. SESSIONS, a citizen of the United States, residing at Columbus, in the county of Franklin and State of Ohio, have invented certain new and useful Improvements in Cable-Reeling Mechanisms, of which the following is a specification, reference being had therein to the accompanying drawing.

The general construction and mode of operation of electric locomotives having cable reeling mechanisms are now well known and understood. These locomotives are used principally in mines for collecting together into trains loaded mine cars from branch entries and from various rooms in which cutting operations are being carried on. The rooms and branch entries are provided with tracks, but not with current supply wires. Therefore, when it is desired to operate a locomotive in one of the branch entries or rooms the cable reeling mechanism is used to carry and to wind and unwind a conductor cable, the free end of which is secured to a stationary electric conductor, such as a trolley wire. In this way current is carried from the stationary electric conductor to the locomotive while it is operating over tracks in the branch entries and rooms.

The object of this invention is to provide an improved cable reel mechanism compact in form and simple in construction and operation, especially adapted for use with locomotives not originally designed for such operation.

In the accompanying drawings, which show the embodiment of my invention which I now deem preferable, Figure 1 is a side view of a locomotive with my improved cable reel mechanism attached. Fig. 2 is a plan view of the locomotive and cable reel mechanism. Fig. 3 is a cross sectional elevation through the cable reel mechanism. Fig. 4 is a side elevation of the cable reel mechanism.

Referring to the drawings, A represents as a whole an electric locomotive which is provided with the main frame 1, the axles 2, 2, the track wheels 3, 3 and the driving motors 4, 4.

At one end of the locomotive there are provided two cross-bars 5, 5 extending between the two sides of the locomotive frame. These cross-bars are preferably angle irons. Above these cross-bars 5, 5 and extending between them is a bracket 6 upon which the cable reel and the driving mechanism therefor are mounted.

7 represents as an entirety the cable reel, which is mounted to rotate about a horizontal axis. The reel comprises a hollow drum 8, cable guiding and retaining side flanges 9, 9 and a hub 10 upon which the drum 8 is mounted. It will be observed that the drum 8 is made up of two separate sections arranged on opposite sides of a flange 11 on the hub. Through bolts 12, 12 serve to tie the side plates and the drum sections to this flange.

13 is a sleeve or quill to which the hub 10 is secured. The ball journal bearings 14 and 15 serve to rotatably support the quill and through the quill the whole reel.

16 is a horizontal shaft rotatably mounted near its center in a bearing 17 secured in the quill 13 and at one end in the bearing 18 on the bracket 6. At the other end of the shaft there is secured a clutch element 19 which lies within a cylindrical recess formed in the hub 10. 20 and 21 represent two interengaging series of friction disks, the disks of one series being connected to the clutch element 19 by means of teeth 22, 22 and the disks of the other series being connected to the hub 10 by means of bolts 23, 23. 24 is a plate secured against rotation by means of the bolts 23, 23 and pressed against the outer of the disks by means of the springs 25, 25 on the bolts. The outer ends of the springs are adjustably held by means of nuts 26, 26. The construction which I have described provides a friction clutch adapted to transmit a limited amount of power from the shaft 16 to the reel.

27 is a worm wheel secured to the shaft 16 between the bearings 17 and 18. This worm wheel engages with the worm 28 which is positioned above it and which is mounted upon the horizontal motor shaft 29.

30 represents the motor which is mounted upon the bracket 6. The motor shaft 29 is preferably provided with three ball journal bearings, 31, 32 and 33, arranged one at the motor end, one at one side of the worm and the third at the other side of the worm. At the end of the shaft opposite to the motor there is provided a ball thrust bearing 34. The two bearings 33 and 34 are supported on a head 35 which is secured to the upper section of the bracket 6 and which is provided with a projection extending into the worm pocket.

At the side of the reel opposite to the motor a block 36 of insulating material is suitably supported on the locomotive frame. This block carries a bracket 37 which is provided with a wire socket 38 and with a pivot pin 39. Upon this pivot pin there is rotatably mounted a cylinder 40 which is provided with a wire socket 41. At the end of the pivot pin 39 is a washer 42 and a nut 43. Secured to the cylinder 40 is a spring 44 which engages the washer 42 and holds the cylinder in a position to provide good electrical contact with the bracket 37. The end of the cable 45 is secured in the socket 41 and serves to cause the cylinder 40 to rotate with the reel. The end of the supply conductor to the motors is secured in the socket 38.

Electrical connections are provided from the trolley wheel or from the cable through the main controller 49 and through the motors 4, 4. A connection is also provided through the reel motor controller 50 and through the reel motor so that when the controller 50 is in "on" position the motor 30 will be continuously energized for rotation to tend to turn the reel in the winding direction.

Assuming that the locomotive is in position with the cable unwound from the reel and is ready to start toward the fixed conductor, then the motor 30 is energized and transmits power through the worm 28, the wheel 27, the shaft 16 and the disk clutch to turn the reel in the direction to wind the cable. The power of the motor is sufficient to maintain a tension in the cable for all locomotive speeds. When it is desired to operate the locomotive in the other direction, then the current may, if desired, be cut off from the motor 30 and the cable allowed to unwind against the resistance of the disk clutch, which serves as a friction brake. The worm wheel engaging the worm serves to prevent the shaft from rotating in the reverse direction. For short movements of the locomotive in forward and reverse directions it is not necessary to deënergize the motor 30 and in fact it will ordinarily be found advantageous to leave it in operation continuously. In this way a continuous torque is applied to the reel, whether the locomotive be moving in one direction, whether it be standing still, or whether it be moving in the other direction.

It will be observed that the mechanism which I have provided by my invention is simple and entirely self-contained. By the provision of suitable cross-bars 5, 5 the mechanism may be attached to any locomotive, even though not originally intended for cable reel operation.

What I claim is:

In a cable reeling mechanism, the combination of a supporting framework, a cable reel provided at one side with an axial hollow trunnion rotatably mounted in the framework, the reel being supported solely by the trunnion and having an axial chamber within its outlines which is open at the side opposite the trunnion, an independently rotatable shaft extending through the hollow trunnion into the axial chamber, means connected to the shaft at its outer end for driving it, and a friction clutch in the said chamber for connecting the inner end of the shaft with the reel, parts of the clutch being removable through the said open end of the chamber.

In testimony whereof I affix my signature, in presence of two witnesses.

FRANK L. SESSIONS.

Witnesses:
N. D. LEVIN,
DUDLEY T. FISHER.

Copies of this patent may be obtained for five cents each, by addressing the "Commissioner of Patents, Washington, D. C."